(12) United States Patent
Muñoz De La Torre Alonso

(10) Patent No.: US 12,388,877 B2
(45) Date of Patent: Aug. 12, 2025

(54) PACKET FLOW DESCRIPTOR PROVISIONING

(71) Applicant: Telefonaktiebolaget LM Ericsson (publ), Stockholm (SE)

(72) Inventor: Miguel Angel Muñoz De La Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/015,241

(22) PCT Filed: Aug. 25, 2020

(86) PCT No.: PCT/EP2020/073686
§ 371 (c)(1),
(2) Date: Jan. 9, 2023

(87) PCT Pub. No.: WO2022/012764
PCT Pub. Date: Jan. 20, 2022

(65) Prior Publication Data
US 2023/0262098 A1    Aug. 17, 2023

(30) Foreign Application Priority Data
Jul. 15, 2020   (EP) .................................. 20382634

(51) Int. Cl.
*H04L 65/1016*   (2022.01)
*H04L 47/2483*   (2022.01)
(Continued)

(52) U.S. Cl.
CPC ...... *H04L 65/1016* (2013.01); *H04L 47/2483* (2013.01); *H04L 47/822* (2013.01); *H04L 65/1069* (2013.01); *H04L 65/1073* (2013.01)

(58) Field of Classification Search
CPC ............. H04L 65/1016; H04L 47/2483; H04L 47/822; H04L 65/1069; H04L 65/1073; H04L 65/80; H04L 47/70; G06N 20/00
See application file for complete search history.

(56) References Cited

U.S. PATENT DOCUMENTS

| | | | |
|---|---|---|---|
| 2016/0234094 A1* | 8/2016 | Balabine | H04L 43/04 |
| 2018/0069798 A1* | 3/2018 | Bacik | H04W 24/08 |

(Continued)

FOREIGN PATENT DOCUMENTS

| | | | | |
|---|---|---|---|---|
| CN | 109600243 A | 4/2019 | | |
| WO | WO-2005122474 A1 * | 12/2005 | ........... | H04L 41/142 |
| WO | WO-2019234481 A1 * | 12/2019 | ......... | H04L 12/1407 |

OTHER PUBLICATIONS

International Search Report and Written Opinion of the International Searching Authority for PCT International Application No. PCT/EP2020/073686 dated Mar. 30, 2021.

(Continued)

*Primary Examiner* — Tonia L Dollinger
*Assistant Examiner* — Mehulkumar J Shah
(74) *Attorney, Agent, or Firm* — Sage Patent Group

(57) ABSTRACT

A method for enabling an efficient provisioning of Packet Flow Descriptors (PFD) for the detection of applications in 5GC. The method comprises receiving a PFD together with an application identifier and at least one further parameter, aggregating the PFD with other PFDs of the application identifier sharing the at least one further parameter and storing the aggregated set of PFDs together with the application identifier and at least one further parameter in a user data repository entity. The method further comprises receiving a PFD request including the application identifier and at least one further parameter and transmitting a set of PFDs matching the application identifier and the at least one further parameter. The at least one further parameter com- (Continued)

prises at least one of an application version, an operating system identifier, an operating system version, a UE identifier, a UE vendor identifier, or a UE model type.

10 Claims, 7 Drawing Sheets

(51) Int. Cl.
    *H04L 47/70*     (2022.01)
    *H04L 65/1069*     (2022.01)
    *H04L 65/1073*     (2022.01)

(56)     References Cited

U.S. PATENT DOCUMENTS

| | | | |
|---|---|---|---|
| 2020/0045753 A1* | 2/2020 | Dao | H04W 4/08 |
| 2020/0112907 A1 | 4/2020 | Dao et al. | |
| 2020/0145876 A1* | 5/2020 | Dao | H04L 12/1407 |
| 2020/0196169 A1 | 6/2020 | Pao et al. | |
| 2020/0228413 A1 | 7/2020 | Chong et al. | |
| 2020/0329008 A1* | 10/2020 | Dao | H04L 61/5007 |
| 2020/0336321 A1* | 10/2020 | Ding | H04L 12/14 |

OTHER PUBLICATIONS

3GPP TS 24.526 V16.3.0, "3rd Generation Partnership Project; Technical Specification Group Core Network and Terminals; User Equipment (UE) policies for 5G System (5GS); Stage 3 (Release 16)," Mar. 2020, 51 pages.

\* cited by examiner

PACKET FLOW DESCRIPTOR PROVISIONING

CROSS REFERENCE TO RELATED APPLICATIONS

This application is a 35 U.S.C. § 371 national stage application of PCT International Application No. PCT/EP2020/073686 filed on Aug. 25, 2020, which claims the benefit of European Patent Application No. 20382634.2, filed on Jul. 15, 2020, the disclosures and content of which are incorporated by reference herein in their entireties.

TECHNICAL FIELD

The present invention generally relates to analytics in mobile networks, and more specifically, the invention relates to traffic classification based on analytics.

BACKGROUND

The NWDAF (Network Data Analytics Function) provides analytics to 5GC (Fifth Generation Core) NFs (Network Functions) and OAM (Operations and Management) systems. Analytics information are either statistical information of the past events, or predictive information. Different NWDAF instances may be present in the 5GC, with possible specializations per type of analytics. The capabilities of a NWDAF instance are described in the NWDAF profile stored in the NRF (Network Repository Function). Each NWDAF instance should provide the list of Analytics Identifiers (ID) that it supports when registering to the NRF, in addition to other NRF registration elements of the NF (Network Function) profile. Other NFs requiring the discovery of an NWDAF instance that provides support for some specific type of analytics may query the NRF and include the Analytics ID(s) that identifies the desired type of analytics for that purpose. The consumers, e.g. 5GC NFs and OAM, decide how to use the data analytics provided by NWDAF.

In 5GC, the detection of applications is done by means of a set of SDF (Service Data Flow) filters, PFD (Packet Flow Descriptor) and/or an application ID. The application is detected at the User Plane using packet header matching, e.g. the packet inspection functionality available in the UPF (User Plane Function), based on the corresponding SDFs or PFDs. The UPF is provisioned with the proper SDFs and/or PFDs for example at the establishment of the data session between the User Equipment (UE) and the Data Network (DN), i.e. the PDU (Packet Data Unit) session establishment procedure in 5GC. The SDFs/PFDs can be also provisioned to the UPF in a parallel procedure, e.g. the PFD management procedures in 5GC. These PFD management procedures are typically handled by the SMF (Session Management Function) and can be of a push or pull nature. In pull procedures, the PFDs for a certain application are requested e.g. by SMF, and in push procedures the PFDs are provided in a proactive manner e.g. to SMF.

A problematic aspect is that the number of applications or services available in the market is growing highly, and thousands of new applications are released on the market per day. The velocity of new application release is also increasing very rapidly. Detecting and managing all applications using manually provisioned rules (i.e. SDFs and/or PFDs) is hard to match with the application diversity and appearance velocity, and the deployment of those rules is costly and inefficient.

SUMMARY

An object of the invention is to enable an efficient provisioning of PFDs for the detection of applications in 5GC.

A first aspect of the invention relates to a method performed by a network data analytics entity for provisioning Packet Flow Descriptors. The method includes receiving a PFD together with an application identifier and at least one further parameter, the at least one further parameter comprising at least one of an application version, an operating system identifier, an operating system version, a User Equipment, UE, identifier, a UE vendor identifier, a UE model type, an indication of number of matches in the PFD, and/or an indication of traffic volume of the PFD; aggregating the PFD with other PFDs of the application identifier into an aggregated set of PFDs for that application identifier, wherein the PFDs within the set share the same at least one further parameter; and transmitting the aggregated set of PFDs together with the application identifier and at least one further parameter. In an embodiment of the method, the receiving step comprises receiving the PFD from a policy control entity, a user plane entity or a UE. In an embodiment of the method, the set of aggregated PFDs is transmitted to a user data repository entity. In an embodiment of the method, the method further includes transmitting a request for PFDs including an application identifier and also including an indication to report the PFDs together with at least one further parameter, the at least one further parameter comprising at least one of application version, an operating system identifier, an operating system version, a UE identifier, a UE vendor identifier, a UE model type, an indication of number of matches in the PFD, or an indication of traffic volume of the PFD. In an embodiment of the method, the request is transmitted to a policy control entity, a user plane entity or a UE.

A second aspect of the invention relates to a method performed by a policy control entity for configuring Packet Flow Descriptor reporting in a User Equipment. The method includes receiving from a network data analytics entity a request for PFDs including an application identifier and also including an indication that the PFD shall be reported together with at least one further parameter, the at least one further parameter comprising at least one of an application version, an operating system identifier, an operating system version, a UE identifier, a UE vendor identifier, a UE model type, an indication of number of matches in the PFD, and/or an indication of traffic volume of the PFD; and transmitting to the UE, or to an access and mobility management entity serving the UE, an indication to configure the reporting of PFDs of the application identifier, including the application identifier and also including an indication that the PFD report shall be reported together with the at least one further parameter. In an embodiment of the method, the receiving and transmitting steps further comprise one of a network data analytics entity identifier or a network data analytics entity address.

A third aspect of the invention relates to a method performed by a User Equipment for reporting Packet Flow Descriptors. The method includes receiving from a policy control entity or an access and mobility management entity an indication to report PFDs of an application identifier, including the application identifier and also including an indication that the PFD report shall be reported together with at least one further parameter, the at least one further parameter comprising at least one of an application version, an operating system identifier, an operating system version, a User Equipment, UE, identifier, a UE vendor identifier, a UE model type, an indication of number of matches in the PFD, or an indication of traffic volume of the PFD; detecting a PFD of the application identifier; and transmitting to a CP entity the PFD along with the application identifier and the at least one further parameter. In an embodiment of the method, the CP entity is the policy control entity or the access and mobility management entity. In an embodiment of the method, the receiving step further comprises one of a network data analytics entity identifier or a network data analytics entity address; and wherein the CP entity is a network data analytics entity.

A fourth aspect of the invention relates to a method performed by a user data repository entity for handling Packet Flow Descriptors. The method includes receiving from a network data analytics entity a set of PFDs together with an application identifier and at least one first further parameter, the at least one first further parameter comprising at least one of an application version, an operating system identifier, an operating system version, a UE identifier, a UE vendor identifier, or a UE model type; storing the set of PFDs along with the application identifier and the at least one first further parameter; receiving a PFD request including the application identifier and at least one second further parameter, the at least one second further parameter comprising at least one of an application version, an operating system identifier, an operating system version, a UE identifier, a UE vendor identifier, or a UE model type; and transmitting a set of PFDs matching the application identifier and the at least one second further parameter. In an embodiment of the method, the PFD request is received from a network exposure entity, a session management entity or a policy control entity, and the matching PFDs are transmitted to the network exposure entity, the session management entity or the policy control entity Other aspects of the invention relate to mobile network nodes, particularly a network data analytics entity, a policy control entity, a User Equipment and a user data repository entity, each configured to perform the respective methods as described herein. Other aspects of the invention relate to computer program and computer program products.

In some embodiments of these aspects, the network data analytics entity is a Network Data Analytics Function (NWDAF). In some embodiments of these aspects, the policy control entity is a Policy Control Function (PCF). In some embodiments of these aspects, the user data repository entity is a User Data Repository (UDR).

Advantageously, the solution disclosed herein enables an efficient provisioning of PFDs when there is a large number of applications to detect and/or PFDs to manage. The disclosed solution allows to provision just the PFDs that are used to detect the applications based on the different parameters used for matching the PFD requests in the PFD management procedures.

Further advantageously, the solution disclosed herein enables the detection of applications that do not have pre-provisioned PFDs, e.g. by provisioning them from an Application Function (AF) and storing them in the user data repository entity. This also enables the detection of newly released applications that do not have known PFDs.

Further advantageously, the solution disclosed herein allows the network operator to support a fully automated mechanism to detect and classify traffic for any application, irrespective of the application traffic being encrypted or not. The solution does not require any SLA agreement with the Content Provider.

Further advantageously, the solution disclosed herein allows to improve ML (Machine Learning) based classification thanks to the prefiltering. This enables to narrow down the number of alternatives before invoking the ML algorithms. This will also improve detection accuracy.

Further advantageously, the solution disclosed herein allows that the obtained classification rules can be added to the ones provisioned through existing collaborative solutions (e.g. Nnef PFD Management), so the proposed solution also acts as a complement to the scenario where there is collaboration.

Further advantageously, the solution disclosed herein does not require to be supported in every UE, i.e. UEs not supporting the PFD reporting will also benefit from the solution.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The invention may best be understood by referring to the following description and accompanying drawings that are used to illustrate particular embodiments of the invention. In the drawings.

DETAILED DESCRIPTION

The invention will now be described in detail hereinafter with reference to the accompanying drawings, in which examples of embodiments or implementations of the invention are shown. The invention may, however, be embodied or implemented in many different forms and should not be construed as limited to the embodiments set forth herein. Rather, these embodiments are provided so that this disclosure will be thorough and complete, and will fully convey the scope of present invention to those skilled in the art. It should also be noted that these embodiments are not mutually exclusive. Components from one embodiment may be tacitly assumed to be present/used in another embodiment. These embodiments of the disclosed subject matter are presented as teaching examples and are not to be construed as limiting the scope of the disclosed subject matter. For example, certain details of the described embodiments may be modified, omitted, or expanded upon without departing from the scope of the described subject matter.

Figure 1:
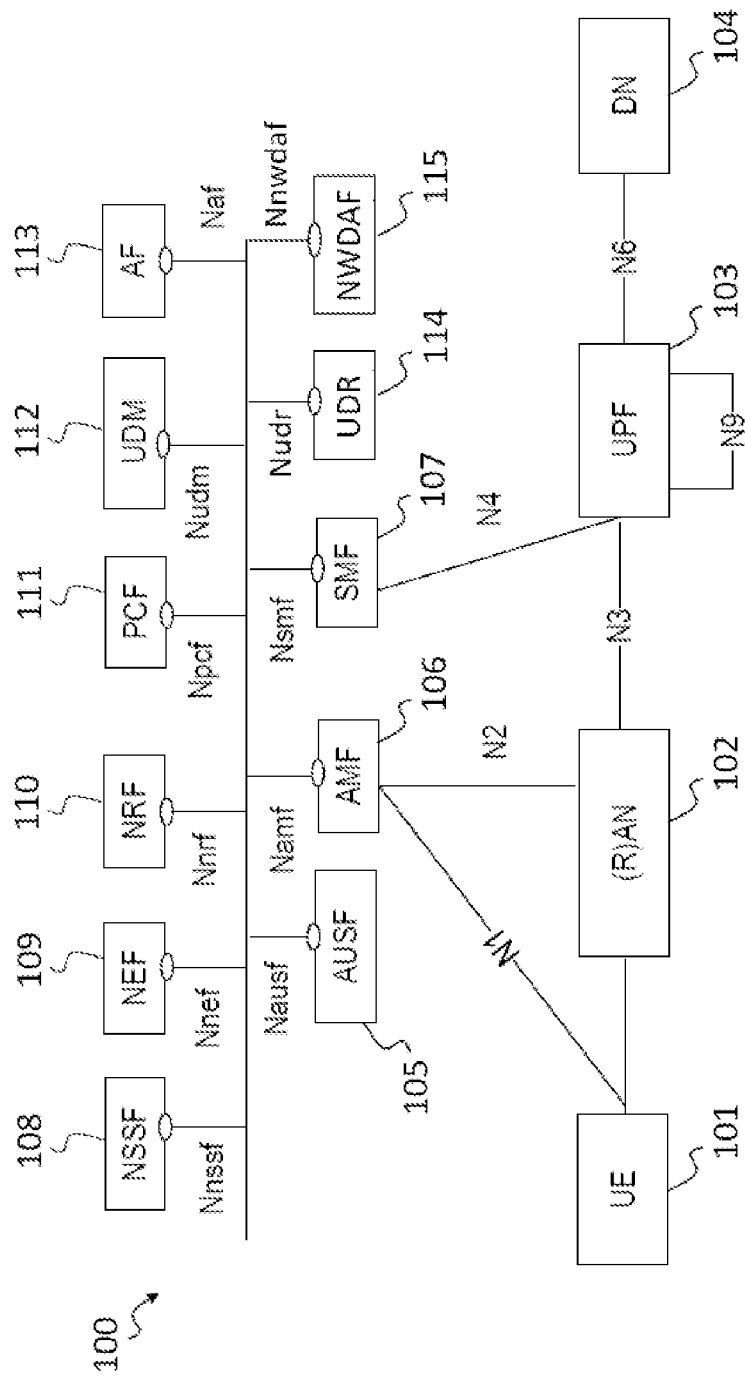
FIG. 1 is a networked system in accordance with particular embodiments of the solution described herein.

The example embodiments described herein arise in the context of a telecommunications network, including but not limited to a telecommunications network that conforms to and/or otherwise incorporates aspects of a fifth generation (5G) architecture. FIG. 1 is an example networked system 100 in accordance with example embodiments of the present disclosure. FIG. 1 specifically illustrates User Equipment (UE) 101, which may be in communication with a (Radio) Access Network (RAN) 102 and Access and Mobility Management Function (AMF) 106 and User Plane Function (UPF) 103. The AMF 106 may, in turn, be in communication with core network services including Session Management Function (SMF) 107 and Policy Control Function (PCF) 111. The core network services may also be in communication with an Application Server/Application Function (AS/AF) 113. Other networked services also include Network Slice Selection Function (NSSF) 108, Authentication Server Function (AUSF) 105, User Data Management (UDM) 112, Network Exposure Function (NEF) 109, Network Repository Function (NRF) 110, User Data Repository (UDR) 114, Network Data Analytics Function (NWDAF) 115 and Data Network (DN) 104. In some example implementations of embodiments of the present disclosure, an AMF 106, SMF 107, UPF 103, PCF 111, AUSF 105, NRF 110, UDM 112, NEF 109, AF 113, UDR 114, NWDAF 115, and NSSF 108 are each considered to be an NF. One or more additional instances of the network functions (NF) may be incorporated into the networked system.

The solution described herein aims to enable an efficient provisioning of PFDs for the detection of applications in 5GC.

To achieve such object, this disclosure provides a method performed by a network data analytics entity, a policy control entity, a User Equipment 101 and a user data repository entity. In some embodiments, the network data analytics entity is a NWDAF 115. In some embodiments, the policy control entity is a PCF 111. In some embodiments, the user data repository entity is a UDR 114.

The method comprises receiving at the network data analytics entity a PFD together with an application identifier and at least one further parameter, the at least one further parameter comprising at least one of an application version, an operating system identifier, an operating system version, a User Equipment, UE, identifier, a UE vendor identifier, a UE model type, an indication of number of matches in the PFD, and/or an indication of traffic volume of the PFD; aggregating at the network data analytics entity the PFD with other PFDs of the application identifier into an aggregated set of PFDs for that application identifier, wherein the PFDs within the set share the same at least one further parameter; and transmitting from the network data analytics entity the aggregated set of PFDs together with the application identifier and at least one further parameter. In some embodiments of the method, the method further comprises transmitting from the network data analytics entity a request for PFDs including an application identifier and also including an indication to report the PFDs together with at least one further parameter, the at least one further parameter comprising at least one of application version, an operating system identifier, an operating system version, a UE identifier, a UE vendor identifier, a UE model type, an indication of number of matches in the PFD, or an indication of traffic volume of the PFD. In some embodiments of the method, the receiving step comprises receiving the PFD from a policy control entity, a user plane entity or a UE. In some embodiments of the method, the set of aggregated PFDs is transmitted to a user data repository entity. In some embodiments of the method, the request is transmitted to a policy control entity, a user plane entity or a UE.

The method further comprises receiving at the policy control entity from the network data analytics entity a request for PFDs including an application identifier and also including an indication that the PFD shall be reported together with at least one further parameter, the at least one further parameter comprising at least one of an application version, an operating system identifier, an operating system version, a UE identifier, a UE vendor identifier, a UE model type, an indication of number of matches in the PFD, and/or an indication of traffic volume of the PFD; and from the policy control entity transmitting to the UE, or to an access and mobility management entity serving the UE, an indication to configure the reporting of PFDs of the application identifier, including the application identifier and also including an indication that the PFD report shall be reported together with the at least one further parameter. In some embodiments of the method, the receiving and transmitting steps further comprise one of a network data analytics entity identifier or a network data analytics entity address.

The method further comprises receiving at the UE from the policy control entity or an access and mobility management entity an indication to report PFDs of an application identifier, including the application identifier and also including an indication that the PFD report shall be reported together with at least one further parameter, the at least one further parameter comprising at least one of an application version, an operating system identifier, an operating system version, a User Equipment, UE, identifier, a UE vendor identifier, a UE model type, an indication of number of matches in the PFD, or an indication of traffic volume of the PFD; detecting at the UE a PFD of the application identifier; and transmitting from the UE to a CP entity the PFD along with the application identifier and the at least one further parameter. In some embodiments of the method, the CP entity is the policy control entity or the access and mobility management entity. In some embodiments of the method, the receiving step further comprises one of a network data analytics entity identifier or a network data analytics entity address; and wherein the CP entity is a network data analytics entity.

The method further comprises receiving at the user data repository entity from a network data analytics entity a set of PFDs together with an application identifier and at least one first further parameter, the at least one first further parameter comprising at least one of an application version, an operating system identifier, an operating system version, a UE identifier, a UE vendor identifier, or a UE model type; storing at the user data repository entity the set of PFDs along with the application identifier and the at least one first further parameter; receiving at the user data repository entity a PFD request including the application identifier and at least one second further parameter, the at least one second further parameter comprising at least one of an application version, an operating system identifier, an operating system version, a UE identifier, a UE vendor identifier, or a UE model type; and transmitting from the user data repository entity a set of PFDs matching the application identifier and the at least one second further parameter. In some embodiments of the method, the PFD request is received from a network exposure entity, a session management entity or a policy control entity, and the matching PFDs are transmitted to the network exposure entity, the session management entity or the policy control entity.

This disclosure also provides mobile network nodes, particularly a network data analytics entity 800, a policy control entity 900, a user data repository entity 1000 and a UE 1100, each configured to perform the respective methods as described herein. This disclosure also provides the corresponding computer program and computer program products comprising code, for example in the form of a computer program, that when run on processing circuitry of the mobile network nodes causes the mobile network nodes to perform the disclosed methods.

Advantageously, the solution disclosed herein enables an efficient provisioning of PFDs when there is a large number of applications to detect and/or PFDs to manage. The disclosed solution allows to provision just the PFDs that are used to detect the applications based on the different parameters used for matching the PFD requests in the PFD management procedures.

Further advantageously, the solution disclosed herein enables the detection of applications that do not have pre-provisioned PFDs, e.g. by provisioning them from an Application Function (AF) and storing them in the user data repository entity. This also enables the detection of newly released applications that do not have known PFDs.

Further advantageously, the solution disclosed herein allows the network operator to support a fully automated mechanism to detect and classify traffic for any application, irrespective of the application traffic being encrypted or not. The solution does not require any SLA agreement with the Content Provider.

Further advantageously, the solution disclosed herein allows to improve ML (Machine Learning) based classification thanks to the prefiltering. This enables to narrow down the number of alternatives before invoking the ML algorithms. This will also improve detection accuracy.

Further advantageously, the solution disclosed herein allows that the obtained classification rules can be added to the ones provisioned through existing collaborative solutions (e.g. Nnef PFD Management), so the proposed solution also acts as a complement to the scenario where there is collaboration.

Further advantageously, the solution disclosed herein does not require to be supported in every UE, i.e. UEs not supporting the PFD reporting will also benefit from the solution.

Hereinafter, drawings showing examples of embodiments of the solution are described in detail.

Figure 2:
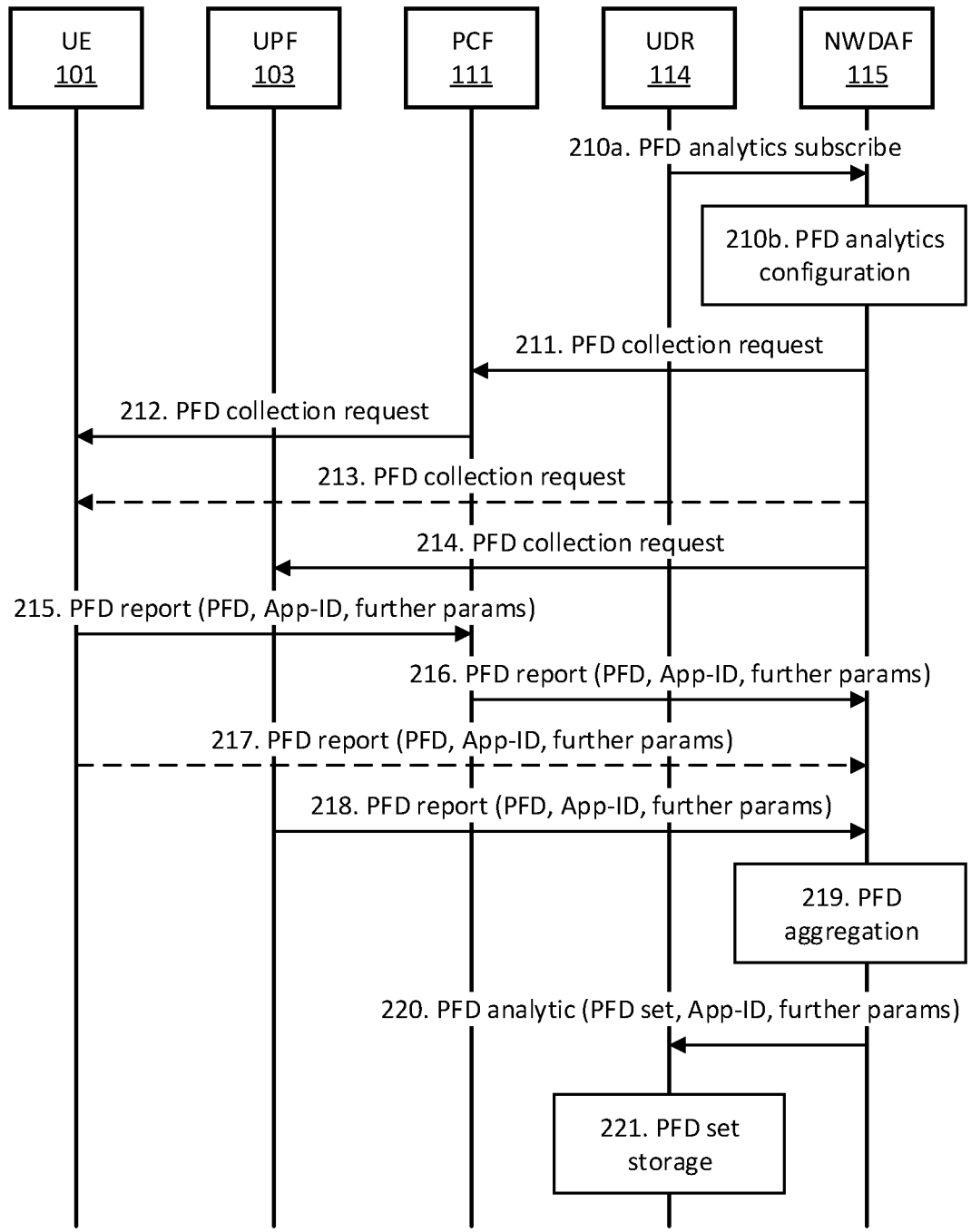
FIG. 2 is a signaling diagram illustrating a procedure according to particular embodiments of the solution described herein.

FIG. 2 is a signaling diagram illustrating a procedure for determining Packet Flow Descriptors based on analytics. The procedure is performed by a network data analytics entity, a network exposure entity, a session management entity, a user plane entity, a user data repository entity, a UE 101, and a policy control entity. In this figure, the network data analytics entity is a NWDAF 115. In this figure, the policy control entity is a PCF 111. In this figure, the user data repository entity is a UDR 114. In this figure, the user plane entity is a UPF 103.

At step 210a, the NWDAF receives a subscription request for PFD analytics. The NWDAF may receive a subscription request from UDR (e.g. in case there is no PFD data for an application in UDR) or any other NF that is interested in receiving such analytics (e.g. SMF or UPF). In some embodiments step 210a includes an application ID.

At step 210b, the NWDAF triggers internally the procedures to generate the PFD analytics. For example, when the network operator wants to detect traffic for a certain application and there is no PFD data for that application in UDR (e.g. non collaborative scenario), the operator can use the OAM system to activate and configure in NWDAF a procedure to retrieve optimized PFD rules on a per application basis.

At step 211, the NWDAF triggers a data collection request for PFDs to PCF. In some embodiments, the NWDAF does so by defining an event in the Npcf_EventExposure service to obtain the PFD rules for an application. This request can be triggered by NWDAF to multiple PCFs (or every PCF) in parallel.

In some embodiments, the NWDAF may triggers data collection also from the UDR. For example, by requesting the UDR for PFD data relative to the application by triggering a Nudr_DataManagement_Subscribe request message including the application ID and DataSet ID.

At step 212, the PCF selects a number of UEs, e.g. based on a sampling value, and generates a UE policy including a rule for PFD reporting and forwards it to the UE. The PCF may perform this step via the AMF in a Namf_AMPolicyControl Request message including:
  Rule precedence: Determines the order the rule is enforced in the UE.
  Traffic Descriptor: Determines the traffic to which the rule applies to, as follow:
    List of application IDs: traffic for a certain application or list of applications.
  PFD Descriptor: Determines the PFD actions, as follows:
    PFD rules: Determines the types of rules the UE will extract from user's traffic:
      3-tuples: where each 3-tuple includes the server IP address, the server port and the IP protocol.
      URLs: significant parts of the URL to be matched, e.g. host name.
      Domain names: e.g. FQDNs (Full Qualified Domain Name), SNIs (Server Name Indication), etc.
    Indication to report Number of matches: When present, it indicates the UE to report the number of matches for each detected PFD
    Indication to report Volume: When present, it indicates the UE to report the volume for each detected PFD
    Application version: Indicates the UE to report the application version installed at UE
    OS: Indicates the UE to report the UE's OS (Operating System), e.g. Android, IoS, Windows Mobile, etc.

OS version: Indicates the UE to report the OS version installed at the UE (e.g. Android 3.4).

UE vendor: Indicates the UE to report the UE vendor (e.g. Samsung, Apple, Huawei)

UE model: Indicates the UE to report the UE model (e.g. Galaxy S10)

UE ID, e.g. PEI (Permanent Equipment Identifier)/IMEI (International Mobile Equipment Identity): Indicates the UE to report the UE ID, e.g. PEI/IMEI.

Destination URI: When present, it determines the URI of the NF (e.g. NWDAF) where the PFD data for the application shall be forwarded to. It can instead be the NF IP address. In case Destination URI is not included, the PFD data shall be forwarded to PCF (through AMF) via NAS (Non-access stratum).

Reporting actions: Determines when to report the PFD rules obtained above to the target NF (e.g. periodically every N seconds).

Subsequently, AMF transparently forwards to the UE the above UE Policy in a N1 AMPolicyControl Request message.

When the UE receives the above information, the UE stores the UE Policy and answers back to AMF/PCF with a N1 AMPolicyControl Response message.

In some embodiments the NWDAF requests the Npcf_EventExposure service exposed by the PCF to obtain the PFD rules. The NWDAF may include the following parameters:

eventId=PFD (This is the new event related to PFD data retrieval for the application)

application ID sampling value: to indicate PCF a percentage of UEs used for PFD retrieval (e.g. sampling=5% means that PCF should trigger the PFD data retrieval from 5% of the UEs having an active PDU session). It might also be instead an accuracy parameter.

At step 213, as an alternative, the NWDAF may also trigger data collection directly to the UE including the same parameters as in steps 211 and 212.

At step 214, the NWDAF triggers data collection to UPF including an application ID. In some embodiments the NWDAF requests the Nupf_EventExposure service exposed by UPF by transmitting a subscribe request to UPF including as parameters the event ID and application ID.

At step 215, when the user starts an application, the UE applies the stored UE Policy for that application. When UE detects traffic from the application as specified in the Traffic Descriptor, UE extracts the requested PFD rules (e.g. 3-tuples and/or SNIs) along with the corresponding number of matches and volume for every new application flow, and at least one further parameter (e.g. application Version, OS ID, OS Version, UE Vendor, UE Model) and transmits them (e.g. periodically) to the PCF (e.g. through AMF via NAS). In some embodiments, when the reporting threshold or period is reached, the UE triggers a PFD report message towards the Destination URI (e.g. PCF IP address). In some embodiments, the UE triggers a PFD report message towards the PCF (through AMF via NAS), when the destination URI is not present.

At step 216, the PCF relies the PFD report including the information transmitted in step 215 to the NWDAF.

At step 217, when the user starts an application, the UE applies the stored UE Policy for that application. When UE detects traffic from the application as specified in the Traffic Descriptor, UE extracts the requested PFD rules (e.g. 3-tuples and/or SNIs) along with the corresponding number of matches and volume for every new application flow, and at least one further parameter (e.g. application Version, OS ID, OS Version, UE Vendor, UE Model) and transmits them (e.g. periodically) to the Destination URI (e.g. NWDAF) when present, or to PCF (through AMF) via NAS, when Destination URI is not present in the UE Policy. In some embodiments, when the reporting threshold or period is reached, the UE triggers a PFD report message towards the Destination URI (e.g. NWDAF IP address). In some embodiments, the UE triggers a PFD report message towards the PCF (through AMF via NAS), when the destination URI is not present.

At step 218, the UPF sends a PFD report towards the NWDAF including the same parameters as in step 215. In some embodiments this message is transmitted via the SMF by using a PFCP (Packet Flow Control Protocol) report message between the UPF and the SMF.

At step 219, the NWDAF aggregates PFD reports from the different UEs. In some embodiments, the NWDAF orders the PFDs according to the number of matches and/or volume. In some embodiments, the NWDAF identifies patterns according to the application ID, App version, UE OS, UE OS version, UE vendor and/or UE model, and generates one or multiple PFD sets. For example, it might be the case that 3-tuples and/or SNIs are different in Android and iOS. As another example, two different applications might have some common PFDs (e.g. same server IP address and/or same SNI). This usually refers to CDN (Content Data Network) caches (caching traffic from different applications) or OTT servers which handle traffic from the different applications. NWDAF will be able to identify those common PFDs. In some embodiments, the NWDAF, based on local criteria (e.g. detection accuracy required for a certain application ID) might include or exclude the common PFDs in the resulting PFD set for that application ID. In some embodiments, the NWDAF obtains two different sets of (ordered) PFDs for the application: for example, one PFD set for an operating system (e.g. Android) and another PFD set for a different operating system (e.g. iOS). In some embodiments, the NWDAF aggregates the PFDs according to the number of matches and/or volume In some embodiments, the NWDAF aggregated the PFDs by identifying patterns according to the application ID, App version, UE OS, UE OS version, UE vendor and/or UE model, and generates one or multiple PFD sets. In some embodiments, the NWDAF uses Machine Learning algorithms such as classification, clustering or regression algorithms.

At step 220, the NWDAF transmits the PFD sets to UDR, for example as Application Data, by triggering a Nudr_Data-Management_Store request message towards UDR including the application ID, an indication of the DataSet (e.g. ApplicationData), the PFD set as aggregated in step 219 and at least one further parameter associated to that PFD set. The at least one further parameter can be one of:

Application version: Indicates the UE to report the application version installed at UE OS: Indicates the UE to report the UE's OS (e.g. Android, IoS, Windows Mobile, etc).

OS version: Indicates the UE to report the OS version installed at the UE (e.g. Android 3.4).

UE vendor: Indicates the UE to report the UE vendor (e.g. Samsung, Apple, Huawei)

UE model: Indicates the UE to report the UE model (e.g. Galaxy S10)

UE ID (e.g. PEI/IMEI): Indicates the UE to report the UE ID, e.g. PEI/IMEI.

In some embodiments, the NWDAF sends the aggregated PFD set to the NEF, so the NEF stores the PFD data for the application ID in UDR as Application Data, along with the other further parameters.

At step 221, the UDR stores the PFDs for the application ID (e.g. as Application Data).

Figure 3:
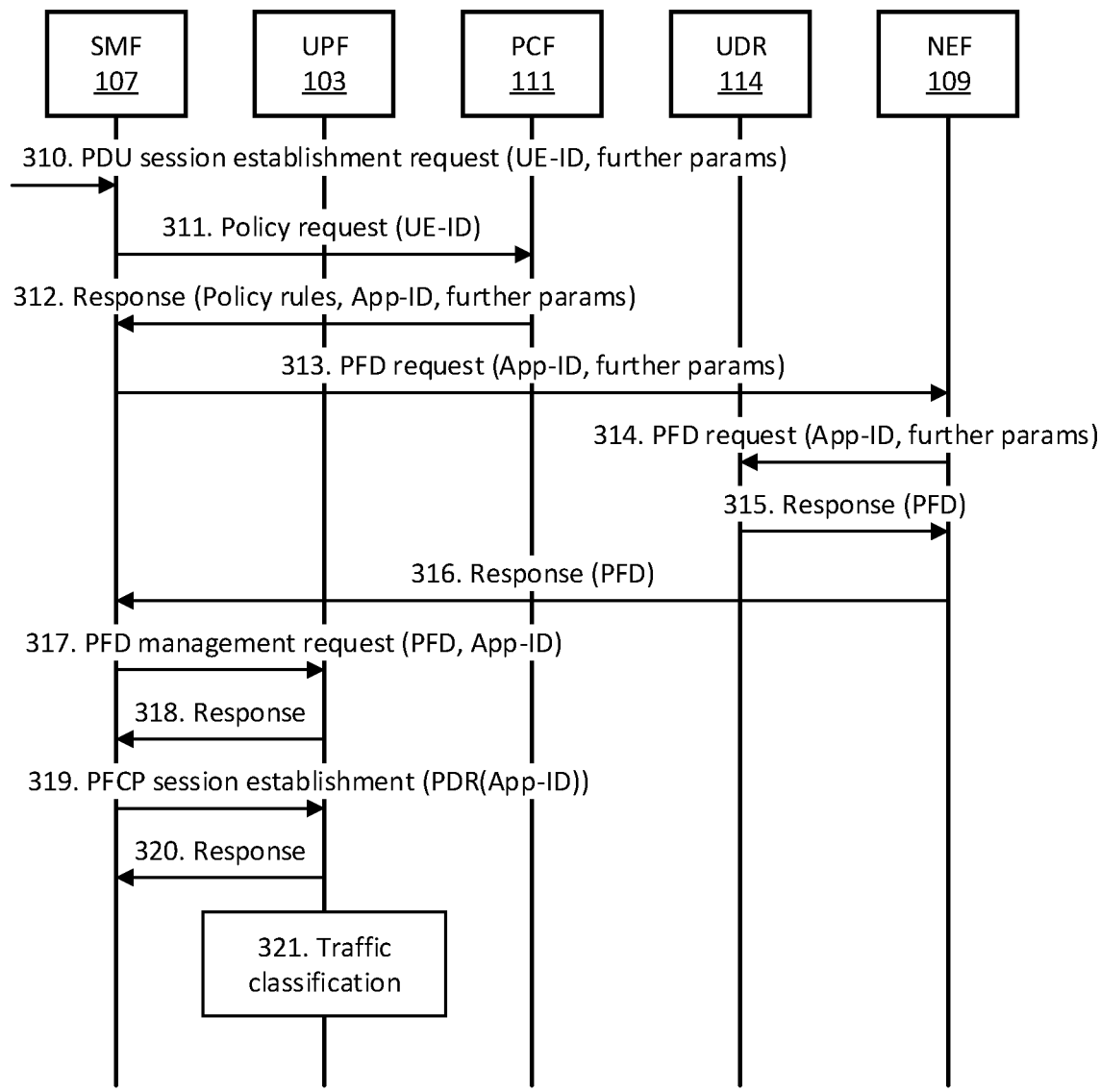
FIG. 3 is a signaling diagram illustrating a procedure according to particular embodiments of the solution described herein.

FIG. 3 is a signaling diagram illustrating a procedure for provisioning PFDs. The procedure is performed by a network exposure entity, a session management entity, a user plane entity, a user data repository entity and a policy control entity. In this figure, the policy control entity is a PCF 111. In this figure, the user data repository entity is a UDR 114. In this figure, the network exposure entity is a NEF 109. In this figure, the session management entity is a SMF 107. In this figure, the user plane entity is a UPF 103. Prior to the execution of this procedure it is assumed that the procedure shown in FIG. 2 has taken place.

At step 310, the SMF receives a PDU session establishment request for a UE-ID including further parameters, for example the User-ID and PEI (which includes the TAC and identifies the UE OS), that are later used in the step 313.

At step 311, the SMF requests the SM policy association to PCF including the User-ID.

At step 312, PCF responds with the PCC rules, specifically a PCC rule for App-ID. The PCF may include further parameters associated with the PCC rules that are later used in the following step.

At step 313, In order to get the traffic filters to send to UPF, SMF invokes the PFD management service in NEF including the App-ID (example.com) and at least one further parameter. The at least one further parameter can be one of:
  Application version: Indicates the application version installed at UE
  OS: Indicates the UE's OS (e.g. Android, IoS, Windows Mobile, etc).
  OS version: Indicates the OS version installed at the UE (e.g. Android 3.4).
  UE vendor: Indicates the UE vendor (e.g. Samsung, Apple, Huawei)
  UE model: Indicates the UE model (e.g. Galaxy S10)
  UE ID (e.g. PEI/IMEI): Indicates the UE ID, e.g. PEI/IMEI.

At step 314, the NEF requests the PFD information to the UDR for the App-ID and the at least one further parameter.

At step 315, the UDR looks for the PFD set matching the application ID and the at least one further parameter and sends the matching PFDs to the NEF.

At step 316, NEF responds to SMF with the matching PFDs.

At step 317, SMF triggers N4 PFD Management request towards UPF including the PFDs for the application ID.

At step 318, UPF acks the N4 PFD Management request.

At step 319, SMF establishes the N4 session for the user with UPF including the PDRs (Packet Detection Rules) for the App-ID.

At step 320, UPF acks the N4 session establishment.

At step 321, UPF uses the received PFDs for the application ID to classify the traffic into the corresponding App-ID (and execute the corresponding policies configured on a per App-ID basis, e.g. QoS).

In some embodiments, in case NWDAF has stored in UDR different sets of (ordered) PFDs for a certain application, UPF will use the corresponding PFD set for detection on a per user session basis (e.g. based on the PEI/IMEI TAC which identifies the UE vendor and UE model, and consequently the UE OS).

Figure 4:
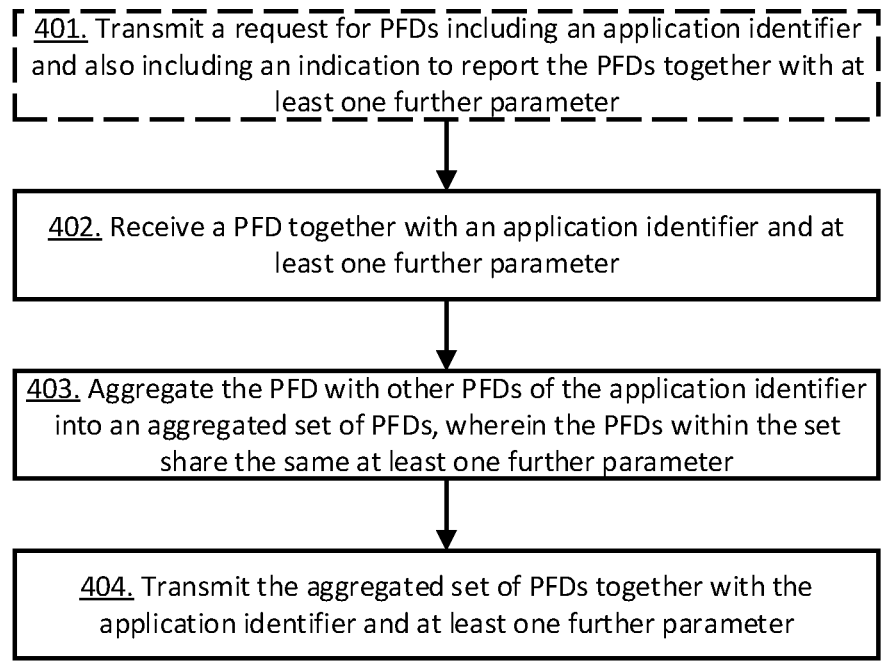
FIG. 4 is a flowchart illustrating a method performed by a mobile network node according to particular embodiments of the solution described herein.

FIG. 4 is a flowchart illustrating a method performed by a network data analytics entity for provisioning Packet Flow Descriptors. In some embodiments, the network data analytics entity is a NWDAF 115.

At step 401, the network data analytics entity transmits a request for PFDs including an application identifier and also including an indication to report the PFDs together with at least one further parameter. The at least one further parameter can be one of:
  Indication to report Number of matches: When present, it indicates the UE to report the number of matches for each detected PFD
  Indication to report Volume: When present, it indicates the UE to report the volume for each detected PFD
  Application version: Indicates the UE to report the application version installed at UE
  OS: Indicates the UE to report the UE's OS (e.g. Android, IoS, Windows Mobile, etc).
  OS version: Indicates the UE to report the OS version installed at the UE (e.g. Android 3.4).
  UE vendor: Indicates the UE to report the UE vendor (e.g. Samsung, Apple, Huawei)
  UE model: Indicates the UE to report the UE model (e.g. Galaxy S10)
  UE ID (e.g. PEI/IMEI): Indicates the UE to report the UE ID, e.g. PEI/IMEI.

At step 402 the network data analytics entity receives a PFD together with an application identifier and the at least one further parameter.

At step 403 the network data analytics entity aggregates the PFD with other PFDs of the application identifier into an aggregated set of PFDs, wherein the PFDs within the set share the same at least one further parameter.

At step 404 the network data analytics entity transmits the aggregated set of PFDs together with the application identifier and the at least one further parameter.

Figure 5:
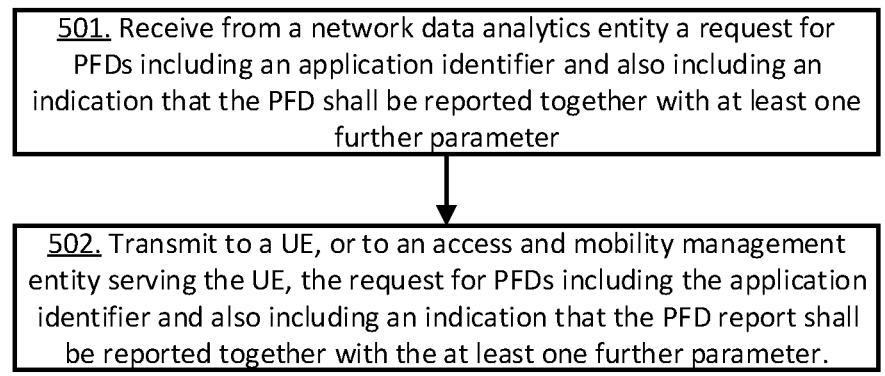
FIG. 5 is a flowchart illustrating a method performed by a mobile network node according to particular embodiments of the solution described herein.

FIG. 5 is a flowchart illustrating a method performed by a policy control entity for configuring Packet Flow Descriptor reporting in a User Equipment. In some embodiments, the policy control entity is a PCF 111.

At step 501, the policy control entity receives from a network data analytics entity a request for PFDs including an application identifier and also including an indication that the PFD shall be reported together with at least one further parameter. The at least one further parameter can be one of:
  Indication to report Number of matches: When present, it indicates the UE to report the number of matches for each detected PFD
  Indication to report Volume: When present, it indicates the UE to report the volume for each detected PFD
  Application version: Indicates the UE to report the application version installed at UE
  OS: Indicates the UE to report the UE's OS (e.g. Android, IoS, Windows Mobile, etc).
  OS version: Indicates the UE to report the OS version installed at the UE (e.g. Android 3.4).
  UE vendor: Indicates the UE to report the UE vendor (e.g. Samsung, Apple, Huawei)
  UE model: Indicates the UE to report the UE model (e.g. Galaxy S10)
  UE ID (e.g. PEI/IMEI): Indicates the UE to report the UE ID, e.g. PEI/IMEI.

At step 502, the policy control entity transmits to a UE, or to an access and mobility management entity serving the UE, the request for PFDs including the application identifier and also including an indication that the PFD report shall be reported together with the at least one further parameter.

Figure 6:
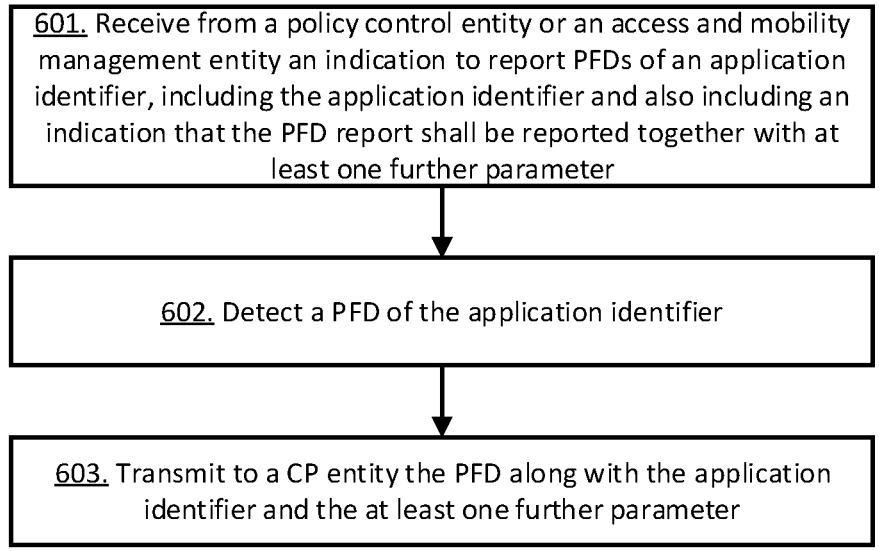
FIG. 6 is a flowchart illustrating a method performed by a UE according to particular embodiments of the solution described herein.

FIG. 6 is a flowchart illustrating a method performed by a UE for reporting Packet Flow Descriptors.

At step 601, the UE receives from a policy control entity or an access and mobility management entity an indication to report PFDs of an application identifier, including the application identifier and also including an indication that the PFD report shall be reported together with at least one further parameter. The at least one further parameter can be one of:

Indication to report Number of matches: When present, it indicates the UE to report the number of matches for each detected PFD Indication to report Volume: When present, it indicates the UE to report the volume for each detected PFD Application version: Indicates the UE to report the application version installed at UE OS: Indicates the UE to report the UE's OS (e.g. Android, IoS, Windows Mobile, etc).

OS version: Indicates the UE to report the OS version installed at the UE (e.g. Android 3.4).

UE vendor: Indicates the UE to report the UE vendor (e.g. Samsung, Apple, Huawei)

UE model: Indicates the UE to report the UE model (e.g. Galaxy S10)

UE ID (e.g. PEI/IMEI): Indicates the UE to report the UE ID, e.g. PEI/IMEI.

At step 602, the UE detects a PFD of the application identifier.

At step 603, the UE transmits to a CP entity the PFD along with the application identifier and the at least one further parameter.

Figure 7:
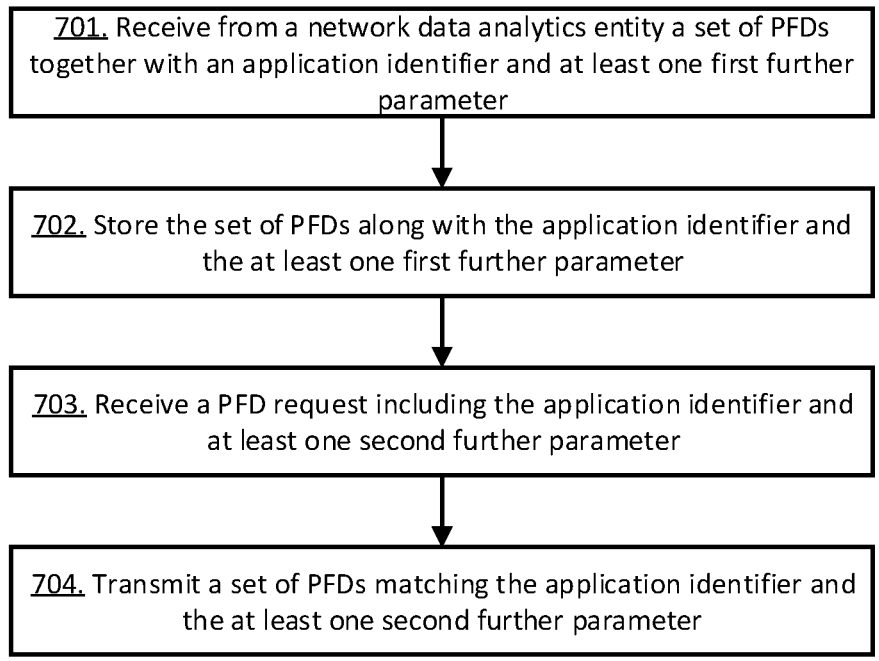
FIG. 7 is a flowchart illustrating a method performed by a mobile network node according to particular embodiments of the solution described herein.

FIG. 7 is a flowchart illustrating a method performed by a user data repository entity for handling Packet Flow Descriptors. In some embodiments, the user data repository entity is a UDR 114.

At step 701, the user data repository entity receives from a network data analytics entity a set of PFDs together with an application identifier and at least one first further parameter. The at least one first further parameter can be one of:

Application version: Indicates the application version installed at UE

OS: Indicates the UE's OS (e.g. Android, IoS, Windows Mobile, etc).

OS version: Indicates the OS version installed at the UE (e.g. Android 3.4).

UE vendor: Indicates the UE vendor (e.g. Samsung, Apple, Huawei)

UE model: Indicates the UE model (e.g. Galaxy S10)

UE ID (e.g. PEI/IMEI): Indicates the UE ID, e.g. PEI/IMEI.

At step 702, the user data repository entity stores the set of PFDs along with the application identifier and the at least one first further parameter.

At step 703, the user data repository entity receives a PFD request including the application identifier and at least one second further parameter. The at least one second further parameter can be one of:

Application version: Indicates the application version installed at UE

OS: Indicates the UE's OS (e.g. Android, IoS, Windows Mobile, etc).

OS version: Indicates the OS version installed at the UE (e.g. Android 3.4).

UE vendor: Indicates the UE vendor (e.g. Samsung, Apple, Huawei)

UE model: Indicates the UE model (e.g. Galaxy S10)

UE ID (e.g. PEI/IMEI): Indicates the UE ID, e.g. PEI/IMEI.

At step 704, the user data repository entity transmits a set of PFDs matching the application identifier and the at least one second further parameter.

Figure 8:
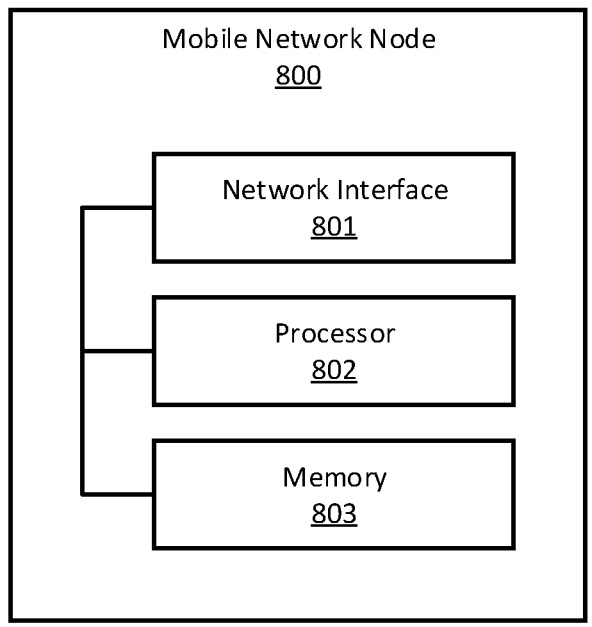
FIG. 8 is a block diagram of a mobile network node configured in accordance with particular embodiments of the solution described herein.

FIG. 8 is a block diagram illustrating elements of a mobile network node 800 of a mobile communications network. In some embodiments, the mobile network node 800 is a network data analytics entity. In some embodiments, the mobile network node 800 is a NWDAF 115. As shown, the mobile network node may include network interface circuitry 801 (also referred to as a network interface) configured to provide communications with other nodes of the core network and/or the network. The mobile network node may also include a processing circuitry 802 (also referred to as a processor) coupled to the network interface circuitry, and memory circuitry 803 (also referred to as memory) coupled to the processing circuitry. The memory circuitry 803 may include computer readable program code that when executed by the processing circuitry 802 causes the processing circuitry to perform operations according to embodiments disclosed herein. According to other embodiments, processing circuitry 802 may be defined to include memory so that a separate memory circuitry is not required. As discussed herein, operations of the mobile network node may be performed by processing circuitry 802 and/or network interface circuitry 801. For example, processing circuitry 802 may control network interface circuitry 801 to transmit communications through network interface circuitry 801 to one or more other network nodes and/or to receive communications through network interface circuitry from one or more other network nodes. Moreover, modules may be stored in memory 803, and these modules may provide instructions so that when instructions of a module are executed by processing circuitry 802, processing circuitry 802 performs respective operations (e.g., operations discussed below with respect to Example Embodiments relating to core network nodes).

Figure 9:
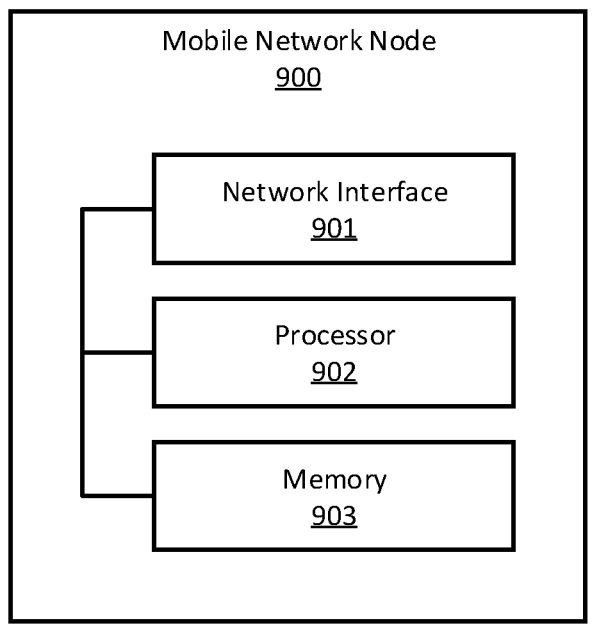
FIG. 9 is a block diagram of a mobile network node configured in accordance with particular embodiments of the solution described herein.

FIG. 9 is a block diagram illustrating elements of a mobile network node 900 of a mobile communications network. In some embodiments, the mobile network node 900 is a policy control entity. In some embodiments, the mobile network node 900 is a PCF 111. As shown, the mobile network node may include network interface circuitry 901 (also referred to as a network interface) configured to provide communications with other nodes of the core network and/or the network. The mobile network node may also include a processing circuitry 902 (also referred to as a processor) coupled to the network interface circuitry, and memory circuitry 903 (also referred to as memory) coupled to the processing circuitry. The memory circuitry 903 may include computer readable program code that when executed by the processing circuitry 902 causes the processing circuitry to perform operations according to embodiments disclosed herein. According to other embodiments, processing circuitry 902 may be defined to include memory so that a separate memory circuitry is not required. As discussed herein, operations of the mobile network node may be performed by processing circuitry 902 and/or network interface circuitry 901. For example, processing circuitry 902 may control network interface circuitry 901 to transmit communications through network interface circuitry 901 to one or more other network nodes and/or to receive communications through network interface circuitry from one or more other network nodes. Moreover, modules may be stored in memory 903, and these modules may provide instructions so that when instructions of a module are executed by processing circuitry 902, processing circuitry 902 performs respective operations (e.g., operations discussed below with respect to Example Embodiments relating to core network nodes).

Figure 10:
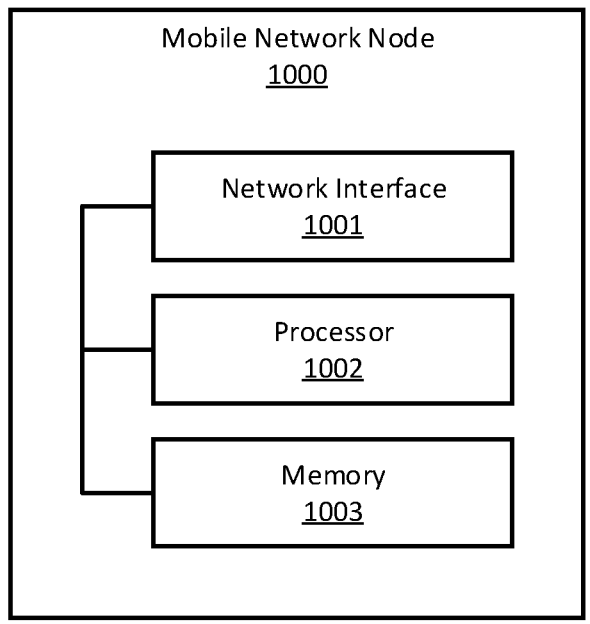
FIG. 10 is a block diagram of a mobile network node configured in accordance with particular embodiments of the solution described herein.

FIG. 10 is a block diagram illustrating elements of a mobile network node 1000 of a mobile communications network. In some embodiments, the mobile network node 1000 is a user data repository entity. In some embodiments, the mobile network node 1000 is a UDR 114. As shown, the mobile network node may include network interface circuitry 1001 (also referred to as a network interface) configured to provide communications with other nodes of the core network and/or the network. The mobile network node may also include a processing circuitry 1002 (also referred to as a processor) coupled to the network interface circuitry, and memory circuitry 1003 (also referred to as memory) coupled to the processing circuitry. The memory circuitry 1003 may include computer readable program code that when executed by the processing circuitry 1002 causes the processing circuitry to perform operations according to embodiments disclosed herein. According to other embodiments, processing circuitry 1002 may be defined to include memory so that a separate memory circuitry is not required. As discussed herein, operations of the mobile network node may be performed by processing circuitry 1002 and/or network interface circuitry 1001. For example, processing circuitry 1002 may control network interface circuitry 1001 to transmit communications through network interface circuitry 1001 to one or more other network nodes and/or to receive communications through network interface circuitry from one or more other network nodes. Moreover, modules may be stored in memory 1003, and these modules may provide instructions so that when instructions of a module are executed by processing circuitry 1002, processing circuitry 1002 performs respective operations (e.g., operations discussed below with respect to Example Embodiments relating to core network nodes).

Figure 11:
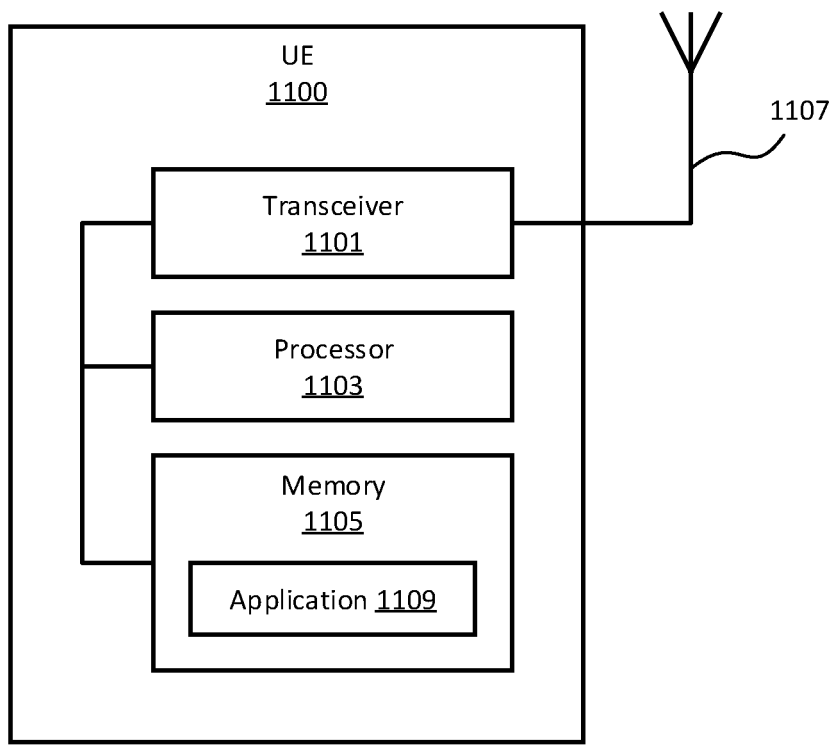
FIG. 11 is a block diagram of a UE configured in accordance with particular embodiments of the solution described herein.

FIG. 11 is a block diagram illustrating elements of a User Equipment (UE) 1100 (also referred to as a communication device, a mobile terminal, a mobile communication terminal, a wireless device, a wireless communication device, a wireless terminal, mobile device, a wireless communication terminal, a user equipment node/terminal/device, etc.) configured to provide wireless communication according to embodiments of the disclosure. As shown, communication device UE may include an antenna 1107, and transceiver circuitry 1101 (also referred to as a transceiver) including a transmitter and a receiver configured to provide uplink and downlink radio communications with a base station(s) (also referred to as a RAN node) of a radio access network. The UE may also include processing circuitry 1103 (also referred to as a processor) coupled to the transceiver circuitry, and memory circuitry 1105 (also referred to as memory, e.g. corresponding to device readable medium) coupled to the processing circuitry. The memory circuitry 1105 may include computer readable program code, such as application client 1109, that when executed by the processing circuitry 1103 causes the processing circuitry to perform operations according to embodiments disclosed herein. According to other embodiments, processing circuitry 1103 may be defined to include memory so that separate memory circuitry is not required. The UE 1100 may also include an interface (such as a user interface) coupled with processing circuitry 1103, and/or the UE may be incorporated in a vehicle. As discussed herein, operations of the UE may be performed by processing circuitry 1103 and/or transceiver circuitry 1101. For example, processing circuitry 1103 may control transceiver circuitry 1101 to transmit communications through transceiver circuitry 1101 over a radio interface to a radio access network node (also referred to as a base station) and/or to receive communications through transceiver circuitry 1101 from a RAN node over a radio interface. Moreover, modules may be stored in memory circuitry 1105, and these modules may provide instructions so that when instructions of a module are executed by processing circuitry 1103, processing circuitry 1103 performs respective operations (e.g., the operations disclosed herein with respect to the example embodiments relating to the UE).

The invention claimed is:

1. A method performed by a network data analytics entity in a communications network for provisioning Packet Flow Descriptors, PFD, the method comprising:
   receiving a PFD together with an application identifier and at least one further parameter, the at least one further parameter comprising at least one of an application version, an operating system identifier, an operating system version, a User Equipment, UE, identifier, a UE vendor identifier, a UE model type, an indication of number of matches in the PFD, and/or an indication of traffic volume of the PFD;
   aggregating the PFD with other PFDs of the application identifier into an aggregated set of PFDs for that application identifier, wherein the PFD and the other PFDs within the aggregated set share the same at least one further parameter, wherein the PFD and the other PFDs within the aggregated set are ordered according to a number of PFD matches and/or associated traffic volume; and
   transmitting the aggregated set of PFDs together with the application identifier and at least one further parameter.

2. The method of claim 1, wherein the receiving step comprises receiving the PFD from a policy control entity, a user plane entity or a UE.

3. The method of claim 1, wherein the set of aggregated PFDs is transmitted to a user data repository entity.

4. The method of claim 1, further comprising:
   transmitting a request for PFDs including an application identifier and also including an indication to report the PFDs together with at least one further parameter, the at least one further parameter comprising at least one of application version, an operating system identifier, an operating system version, a UE identifier, a UE vendor identifier, a UE model type, an indication of number of matches in the PFD, or an indication of traffic volume of the PFD.

5. The method of claim 4, wherein the request is transmitted to a policy control entity, a user plane entity or a UE.

6. A method performed by a User Equipment, UE, in a communications network for reporting Packet Flow Descriptors, PFD, the method comprising:
   receiving, by the UE, from a policy control entity or an access and mobility management entity an indication to report PFDs of an application identifier, including the application identifier and also including an indication that the PFD report shall be reported together with at least one further parameter, the at least one further parameter comprising at least one of an application version, an operating system identifier, an operating system version, a User Equipment, UE, identifier, a UE vendor identifier, a UE model type, an indication of number of matches in the PFD, or an indication of traffic volume of the PFD;
   detecting a PFD of the application identifier; and transmitting to a network data analytics entity the PFD along with the application identifier and the at least one further parameter, wherein the PFD is aggregated into an aggregated set with other PFDs associated with a plurality of other UEs, wherein the PFD and the other PFDs within the aggregated set share the same at least one further parameter and are ordered according to a number of PFD matches and/or associated traffic volume.

7. The method of claim 6, wherein the CP entity is the policy control entity or the access and mobility management entity.

8. The method of claim 6, wherein the receiving step further comprises one of a network data analytics entity identifier or a network data analytics entity address; and wherein the CP entity is a network data analytics entity.

9. A method performed by a user data repository entity in a communications network for handling Packet Flow Descriptors, PFD, the method comprising:
receiving from a network data analytics entity a set of PFDs together with an application identifier and at least one first further parameter, the at least one first further parameter comprising at least one of an application version, an operating system identifier, an operating system version, a UE identifier, a UE vendor identifier, or a UE model type, wherein the set of PFDs includes PFDs that share the same at least one first further parameter and are ordered according to a number of PFD matches and/or associated traffic volume;
storing the set of PFDs along with the application identifier and the at least one first further parameter;
receiving a PFD request including the application identifier and at least one second further parameter, the at least one second further parameter comprising at least one of an application version, an operating system identifier, an operating system version, a UE identifier, a UE vendor identifier, or a UE model type, wherein the set of PFDs includes PFDs that share the same at least one second further parameter and are ordered according to a number of PFD matches and/or associated traffic volume; and
transmitting a requested set of PFDs matching the application identifier and the at least one second further parameter.

10. The method of claim 9, wherein the PFD request is received from a network exposure entity, a session management entity or a policy control entity, and the matching PFDs are transmitted to the network exposure entity, the session management entity or the policy control entity.

* * * * *